United States Patent
Fayed et al.

(10) Patent No.: US 12,375,442 B2
(45) Date of Patent: *Jul. 29, 2025

(54) DECOUPLING OF IP ADDRESS BINDINGS AND USE IN A DISTRIBUTED CLOUD COMPUTING NETWORK

(71) Applicant: CLOUDFLARE, INC., San Francisco, CA (US)

(72) Inventors: Marwan Fayed, St Andrews (GB); Pavel Odintsov, London (GB); Sami Matias Kerola, London (GB)

(*) Notice: Subject to any disclaimer, the term of this patent is extended or adjusted under 35 U.S.C. 154(b) by 402 days.

This patent is subject to a terminal disclaimer.

(21) Appl. No.: 17/503,763

(22) Filed: Oct. 18, 2021

(65) Prior Publication Data
US 2022/0182354 A1     Jun. 9, 2022

Related U.S. Application Data

(63) Continuation of application No. 17/116,864, filed on Dec. 9, 2020, now Pat. No. 11,153,265.

(51) Int. Cl.
*H04L 29/12* (2006.01)
*H04L 9/40* (2022.01)
(Continued)

(52) U.S. Cl.
CPC ...... *H04L 61/4511* (2022.05); *H04L 61/5007* (2022.05); *H04L 63/1458* (2013.01)

(58) Field of Classification Search
CPC . H04L 63/1416; H04L 12/18; H04L 12/6418; H04L 61/59; H04L 61/4552;
(Continued)

(56) References Cited

U.S. PATENT DOCUMENTS 7,523,170 B1* 4/2009 Allen .................... G06F 15/173
                                                      709/217
9,197,487 B2* 11/2015 James ................. H04L 61/4552
(Continued)

OTHER PUBLICATIONS

Belshe et al., Hypertext Transfer Protocol Version 2 (HTTP/2), Internet Engineering Task Force (IETF), Request for Comments: 7540, ISSN: 2070-1721, May 2015, 96 pages.
(Continued)

*Primary Examiner* — Dustin Nguyen
(74) *Attorney, Agent, or Firm* — NICHOLSON DE VOS WEBSTER & ELLIOTT LLP

(57) ABSTRACT

An authoritative domain name system (DNS) server receives a DNS query for an address record for a hostname. The DNS server selects an IP address from multiple IP addresses to include in an answer to the DNS query, where each IP address is capable of being selected to be included in the answer regardless of the hostname being queried, where multiple servers of a distributed cloud computing network are capable of receiving traffic at each IP address, and where none of the IP addresses identify a particular server of the distributed cloud computing network. The authoritative DNS server transmits an answer to the DNS query that includes the selected IP address. Sometime after, one of the servers of the distributed cloud computing network receives a request for content that is addressed to the selected IP address and processes the request.

14 Claims, 5 Drawing Sheets

(51) Int. Cl.
*H04L 61/4511* (2022.01)
*H04L 61/5007* (2022.01)

(58) Field of Classification Search
CPC ... H04L 63/08; H04L 67/1097; H04L 9/0891; H04L 63/0209; G06F 15/173; G06F 16/00
See application file for complete search history.

(56) References Cited

U.S. PATENT DOCUMENTS

| | | | |
|---|---|---|---|
| 9,231,903 | B2 | 1/2016 | Seastrom et al. |
| 9,584,328 | B1 | 2/2017 | Graham-Cumming |
| 9,742,795 | B1 | 8/2017 | Radlein et al. |
| 10,033,692 | B1* | 7/2018 | Vavrusa .................. H04L 61/59 |
| 10,375,016 | B1* | 8/2019 | Vavrusa .................. H04L 12/18 |
| 2003/0126252 | A1 | 7/2003 | Abir |
| 2008/0177994 | A1* | 7/2008 | Mayer ...................... G06F 16/00 709/224 |
| 2010/0077462 | A1* | 3/2010 | Joffe ........................ H04L 63/08 726/5 |
| 2010/0125673 | A1 | 5/2010 | Richardson et al. |
| 2010/0153802 | A1 | 6/2010 | Van et al. |
| 2014/0109225 | A1* | 4/2014 | Holloway ........... H04L 63/1416 726/23 |
| 2015/0215388 | A1 | 7/2015 | Kontothanassis et al. |
| 2017/0153980 | A1 | 6/2017 | Araujo et al. |
| 2017/0310744 | A1 | 10/2017 | Maslak |
| 2020/0007585 | A1* | 1/2020 | Williams .............. H04L 9/0891 |
| 2020/0314065 | A1* | 10/2020 | Roy .................... H04L 63/0209 |
| 2020/0366638 | A1* | 11/2020 | Vasquez .............. H04L 67/1097 |
| 2021/0028959 | A1* | 1/2021 | Lubashev ........... H04L 12/6418 |

OTHER PUBLICATIONS

Bishop, Hypertext Transfer Protocol Version 3 (HTTP/3), draft-ietf-quic-http-32, Oct. 20, 2020, 73 pages.
Brisco, DNS Support for Load Balancing, Request for Comments: 1794, Apr. 1995, 7 pages.
Callahan et al., On Modern DNS Behavior and Properties, ACM SIGCOMM Computer Communication Review, vol. 43, No. 3, Jul. 2013, 8 pages.
Dannewitz et al., Network of Information (NetInf)—An information-centric networking architecture, Computer Communications, 36(7), 2013, pp. 721-735.
Eisenbud et al., Maglev: A Fast and Reliable Software Network Load Balancer, 13th USENIX Symposium on Networked Systems Design and Implementation (NSDI), Mar. 16-18, 2016, 14 pages [downloaded at: https://www.usenix.org/conference/nsdi16/technical-sessions/presentation/eisenbud].
Gandhi et al., Yoda: A Highly Available Layer-7 Load Balancer, European Conference on Computer Systems (EuroSys), 2016, 16 pages.
Han et al., XIA: Efficient Support for Evolvable Internetworking, 9th USENIX Symposium on Networked Systems Design and Implementation ( NSDI 12), 2012, pp. 309-322.
Hoang et al., The Web is Still Small After More Than a Decade, ACM SIGCOMM Computer Communication Review, vol. 50 Issue 2, Apr. 2020, 7 pages.
Holz et al. The Era of TLS 1.3: Measuring Deployment and Use with Active and Passive Methods, arXiv:1907.12762, 2019, 17 pages.
Larisch et al., CRLite: A Scalable System for Pushing All TLS Revocations to All Browsers, 2017 IEEE Symposium on Security and Privacy, pp. 539-556.
Lentz et al. D-mystifying the D-root Address Change, ACM Internet Measurement Conference (IMC), 2013, 6 pages.
Li et al., Internet Anycast: Performance, Problems, & Potential, ACM SIGCOMM, 2018, 15 pages.
Miao et al., SilkRoad: Making Stateful Layer-4 Load Balancing Fast and Cheap Using Switching ASICs, ACM SIGCOMM 2017, Aug. 21-25, 2017, 14 pages.
Moura et al., Cache Me If You Can: Effects of DNS Time-to-Live (extended), ACM Internet Measurement Conference (IMC), May 2019, 15 pages.
Moura, DNS TTL Violations in the Wild—Measured with RIPE Atlas, RIPE Network Coordination Centre, Dec. 1, 2017, [downloaded at: https://labs.ripe.net/Members/giovane_moura/dns-ttl-violations-in-the-wild-with-ripe-atlas-2].
Non-Final Office Action, U.S. Appl. No. 17/116,864, Feb. 16, 2021, 14 pages.
Notice of Allowance, U.S. Appl. No. 17/116,864, Jun. 17, 2021, 15 pages.
Nygren, Reaching Toward Universal TLS SNI, The AKAMAI Blog, Mar. 23, 2017, 6 pages [downloaded at https://blogs.akamai.com/2017/03/reaching-toward-universal-tls-sni.html].
Padmanabhan et al., Reasons Dynamic Addresses Change, ACM Internet Measurement Conference (IMC), 16 pages, 2016.
Release Notes: Junos® OS Release 19.2R3 for the ACX Series, EX Series, MX Series, NFX Series, PTX Series, QFX Series, SRX Series, and Junos Fusion, Jul. 24, 2020, Juniper Networks, 340 pages [downloaded at: https://www.juniper.net/documentation/en_US/junos/information-products/topic-collections/release-notes/19.2/junos-release-notes-19.2.pdf].
Ren et al., Routing and Addressing with Length Variable IP Address, Proceedings of the ACM SIGCOMM 2019 Workshop on Networking for Emerging Applications and Technologies, pp. 43-48.
Richter, et al., A Multi-perspective Analysis of Carrier-Grade NAT Deployment, ACM Internet Measurement Conference (IMC), 2016, 15 pages.
Richter, et al., Beyond Counting: New Perspectives on the Active IPV4 Address Space, ACM Internet Measurement Conference (IMC), 2016, 15 pages.
Sevilla et al., Freeing the IP Internet Architecture from Fixed IP Addresses. In IEEE International Conference on network Protocols (ICNP), 2015, pp. 345-355.
Singh et al., IP Address Multiplexing for VEEs, ACM SIGCOMM Computer Communication Review, vol. 44, No. 2, Apr. 2014, pp. 37-43.
Sitnicki et al., Programmable socket lookup with BPF, Linux Plumbers Conference, Sep. 2019, 75 pages.
Sitnicki, It's crowded in here!, The Cloudflare Blog, CLOUDFLARE, Oct. 12, 2019, 23 pages, [downloaded at: https://blog.cloudflare.com/its-crowded-in-here/].
Sundaresan et al., Measuring and Mitigating Web Performance Bottlenecks in Broadband Access Networks, ACM Internet Measurement Conference (IMC), 2013, 13 pages.
This new tech makes it harder for ISPs to spy on you, Fastcompany.com, Sep. 25, 2018, 4 pages [downloaded at: https://www.fastcompany.com/90240005/this-new-tech-makes-it-harder-for-isps-to-spy-on-you].
Weil, et al., IANA-Reserved IPv4 Prefix for Shared Address Space, Internet Engineering Task Force (IETF), Request for Comments: 6598, Apr. 2012, 11 pages.
What is round-robin DNS? CLOUDFLARE, Inc., downloaded on Dec. 8, 2020, 4 pages [downloaded at: https://www.cloudflare.com/learning/ dns/glossary/round-robin-dns/].
What is the difference between a multivalue answer routing policy and a simple routing policy? AWS: Multivalue Answer Routing, Aug. 3, 2020, 5 pages [downloaded at: https://aws.amazon.com/premiumsupport/knowledge-center/multivalue-versus-simple-policies/].
Zhang et al., Named Data Networking, ACM SIGCOMM Computer Communication Review, vol. 44, No. 3, Jul. 2014, 8 pages.

\* cited by examiner

DECOUPLING OF IP ADDRESS BINDINGS AND USE IN A DISTRIBUTED CLOUD COMPUTING NETWORK

CROSS-REFERENCE TO RELATED APPLICATIONS

This application is a continuation of U.S. Pat. No. 11,153,265, filed Dec. 9, 2020, which is hereby incorporated by reference.

FIELD

Embodiments of the invention relate to the field of computing networks; and more specifically, to decoupling of IP address bindings and use in a distributed cloud computing network.

BACKGROUND

Content delivery networks (CDNs) are used for global reachability of Internet assets with low latency. Most CDNs use geo-replication, load balancing, and other mechanisms to direct client devices to physically proximal copies of the internet assets that are stored on physical machines near the client devices. Conventionally, a CDN uses many IP addresses for many physical devices. A CDN may assign each unique website a unique set of IP addresses. Alternatively, a CDN may assign different websites with the same unique set of IP addresses. The CDN may use name-based virtual hosting to identify hosts. For example, in name-based virtual hosting, in the case of an HTTP request, the server determines which virtual host (e.g., which website) in which a request is to be sent based on the Host header field in the request. The CDN may use the Server Name Indication (SNI) field in Transport Layer Security (TLS) to identify a host. The CDN may use IP-based virtual hosting such that any application on any device can simultaneously listen on all IP:port pairs.

Managing many IP addresses is difficult. IP address changes are expensive, slow, and require substantial planning. If an IP address change is not performed successfully, an unexpected outage and/or load imbalance may occur.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
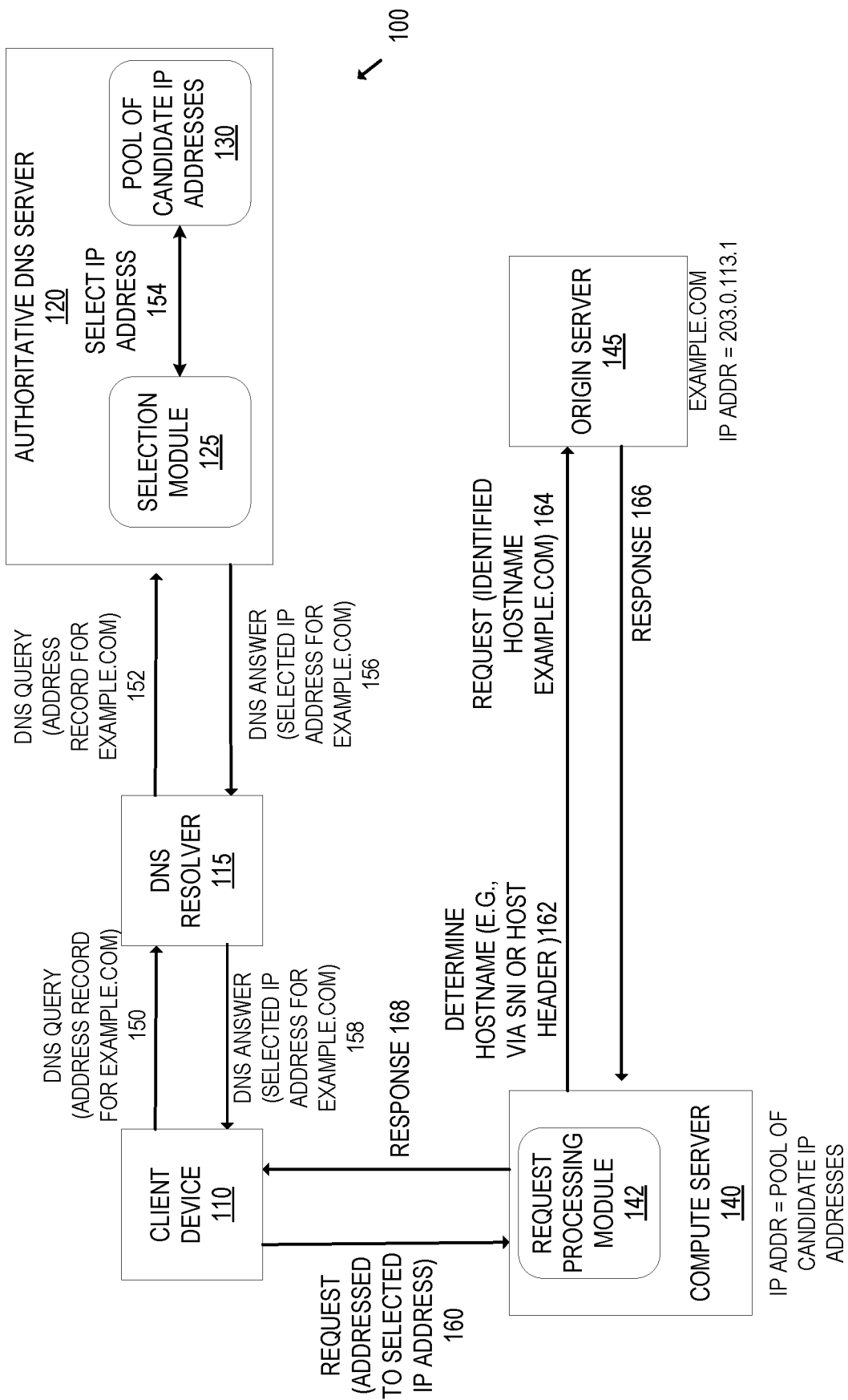
FIG. 1 illustrates an exemplary system that illustrates decoupling of IP address bindings and their use according to an embodiment.

A distributed cloud computing network that decouples IP address bindings (e.g., IP address to hostnames bindings and IP address to machines bindings) is described. The decoupling of the IP address bindings improves IP management, facilitates network engineering, liberates the use of IP space, provides greater resilience, and provides more flexibility in managing and responding to external network and/or infrastructure events. The decoupling allows a service endpoint (e.g., a content delivery network, a cloud computing network, a hosting service, etc.) to dynamically use IP addresses where no prior use of IP addresses restricts future use.

In some embodiments, an authoritative DNS server answers a DNS query for a hostname with an IP address that is selected from a group of IP addresses, where the selection algorithm does not depend on the hostname. Thus, the particular IP address selected for the answer is selected without regard to the particular hostname being queried. For example, unlike conventional approaches, in some embodiments the authoritative DNS server does not use a mapping of hostnames to IP addresses to make the IP address selection. This description sometimes refers to the selection algorithm as being an "on-query" binding in which the IP address is known for a particular hostname only in response to a DNS query for that particular hostname, and the binding is applicable only with respect to the resolver and/or client that made the query and for the duration of a time-to-live (TTL) value associated with the DNS record, which may be a value from 0 (which forces each query to get a new authoritative response) to seconds. Further, in some embodiments, none of the group of IP addresses identify a particular server of the distributed cloud computing network.

The selected IP address may be randomly selected from the group of IP addresses. The selection may make no assumption about the query pattern or contents of the query. Thus, in some embodiments, at any point in time, any website or application handled by the distributed cloud computing network can take on any of the IP addresses from the group of IP addresses. Each of the group of IP addresses are advertised by each of the servers of the distributed cloud computing network. That is, each of the servers may receive traffic addressed to any of the group of IP addresses. Since these IP addresses do not consistently identify particular hostnames, a server that receives traffic addressed to one of these IP addresses cannot determine the hostname directly from the IP address. Instead, a server that receives traffic addressed to one of the group of IP addresses determines the particular hostname based on information other than the IP address itself that indicates the hostname. For example, the SNI field or the HTTP host header may be used to determine the hostname. After determining the hostname, the server then processes the traffic accordingly.

The number of IP addresses in the group of IP addresses can be much smaller (magnitude fewer) than is conventionally used. For example, some CDNs may conventionally use millions of IP addresses to support their customers and machines. CDNs typically require many physical machines that historically needed many IP addresses. For instance, one of the most common ways to achieve low-latency geo-replication is via DNS; when a client looks up the address of a particular website, the CDN provides in its DNS answer the IP address of a server that is close to the client and lightly loaded. If this were the only mechanism a CDN used, it would require providing each physical machine in the CDN's hosting infrastructure its own unique IP address. Also, some conventional CDNs give each website (or in some cases a group of websites) its own unique set of IP addresses. However, the techniques described herein allow for much fewer IP addresses (e.g., one, tens, hundreds, thousands, etc.).

The use of fewer IP addresses improves IP management. For instance, in a large CDN or hosting provider, there may be many thousands or more hostname to IP bindings in DNS records. The complexity for planning and deploying such a system, especially when the hostname to IP bindings may periodically change, is conventionally complex and expensive. Further, changes to these bindings are often manual which leads to unexpected outages and load imbalances due to error. The use of fewer IP addresses reduces or eliminates most of this complexity, and changes can be made easier, faster, simpler, with less cost and less planning.

Further, if a random or pseudorandom selection is used, it is to be expected that at a particular snapshot of time (e.g., over a 24-hour period), each hostname has been allocated each IP address of the pool of IP addresses. Thus, each hostname exists on each IP address rather than on any single IP address. Measures of performance are also expected to be substantially uniformly distributed across the IP addresses (e.g., requests per IP, bytes per IP), irrespective of request patterns and demands. This expected uniform distribution can be used to detect IP-based reachability problems. For example, in some embodiments, the distributed cloud computing network determines whether there is a statistically meaningful difference (e.g., greater than a threshold) between an IP address or prefix with the other IP addresses or prefixes (e.g., requests per IP, bytes per IP).

If there is such a statistically meaningful difference, that IP address or prefix may be unavailable for certain clients. An IP address or prefix could be unavailable for certain clients due to some blacklist of IP addresses and/or routing leaks or routing errors. The distributed cloud computing network can use this information to improve network resilience and/or for debugging. For instance, the DNS logs may be accessed to determine what resolver was given the IP address(es) or prefix(es) that are under scrutiny and determine the autonomous system (AS) corresponding to those resolver(s). The list of determined autonomous systems can be compared with the current list of autonomous systems to determine if there are any missing autonomous system(s). If there is a missing autonomous system, that will identify the blocked path. If an IP address or prefix is determined to be unavailable, that IP address or prefix could be removed from consideration for future selection for a period of time to allow for a diagnosis or a resolution of the cause of the issue.

In an embodiment, the distributed cloud computing network includes multiple nodes (referred herein as distributed cloud computing network nodes or nodes). Each distributed cloud computing network node may include any of one or more compute servers, one or more control servers, one or more DNS servers (e.g., one or more authoritative DNS servers) and one or more other pieces of networking equipment (e.g., one or more routers, switches, hubs, etc.). The distributed cloud computing network node may be part of the same physical device or multiple physical devices. For example, the compute server(s), control server(s), and DNS server(s) may be virtual instances running on the same physical device or may be separate physical devices. Each distributed cloud computing network node may be part of a data center or a collocation site. The distributed cloud computing network nodes are geographically distributed. There may be hundreds to thousands of nodes, for example. The geographically distributed nodes decrease the distance between requesting devices and content. The authoritative DNS servers may have the same anycast IP address. As a result, when a DNS query is made, the network transmits the DNS query to the closest authoritative DNS server (in terms of the routing protocol metrics). In some embodiments, instead of using an anycast mechanism, embodiments use a geographical load balancer to route traffic to the nearest node.

IP traffic for an origin network is received at the distributed cloud computing network instead of being received initially at the origin network. In an embodiment, the distributed cloud computing network includes an authoritative DNS server for hostnames belonging to different customers of the distributed cloud computing network. The zone file records for those hostnames may be changed such that DNS resolution requests for those hostnames resolve to the distributed cloud computing network instead of the origin network. In some embodiments, each of the compute servers of the distributed cloud computing network can receive traffic addressed to any of the pool of IP addresses. Each IP address of the pool of IP addresses may be advertised by each of the compute servers and/or router(s) of each node (e.g., as anycast IP addresses). The particular node that receives a particular IP packet from a client device may be determined by the network infrastructure according to an Anycast implementation or by a geographical load balancer. For instance, an IP packet with a destination IP address of one of the pool of IP addresses that is sent by a client device will be received at a node that is closest to the client device in terms of routing protocol configuration (e.g., Border Gateway Protocol (BGP) configuration) according to an anycast implementation as determined by the network infrastructure (e.g., router(s), switch(es), and/or other network equipment) between the requesting client device and the distributed cloud computing network nodes.

Since the destination IP address of the IP traffic does not consistently identify a particular hostname in embodiments described herein, the compute server that receives the incoming IP traffic cannot determine the hostname from the IP address itself. To say it another way, the compute server does not know the intended destination of the incoming IP traffic based solely on the IP address. Instead, the compute server determines the particular hostname based on information other than the destination IP address, such as information in a higher-level protocol field such as the SNI field or the HTTP host header. After determining the hostname, the server then processes the traffic which may include transmitting the traffic to the origin network.

FIG. 1 illustrates an exemplary system that illustrates decoupling of IP address bindings and their use according to an embodiment. The system 100 includes the authoritative DNS server 120, the compute server 140, and the origin server 145. The authoritative DNS server 120 is an authoritative name server for multiple hostnames that belong to multiple origin networks. The compute server 140 may be one of multiple compute servers of a distributed cloud computing network. The compute server 140 is configured to process network layer traffic (e.g., HTTP/S, SPDY, FTP, TCP, UDP, IPSec, SIP, other IP protocol traffic, or other network layer traffic). In some embodiments, the authoritative DNS server 120 and the compute server 140 are part of the same distributed cloud computing network node. The origin server 145 is a server that serves as the origin for IP traffic for a particular hostname. In the example of FIG. 1, the origin server 145 is an origin server for example.com.

The client device 110 is a computing device (e.g., laptop, desktop, smartphone, mobile phone, tablet, gaming system, set top box, Internet of Things device, etc.) that is capable of transmitting and processing network traffic. The client device 110 may include a client network application that causes the network traffic to be transmitted and processed, such as a web browser or other application capable of accessing network resources (e.g., web pages, images, word processing documents, PDF files, movie files, music files, or other computer files). In practice, the client device 110 transmits DNS queries and receives DNS answers from a DNS system.

For instance, the client device 110 transmits a DNS query for an address record (e.g., an A or AAAA record) for the hostname example.com to the DNS system at operation 150. Typically, DNS queries from client devices are received by a DNS resolver, such as the DNS resolver 115. As shown in FIG. 1, the DNS resolver 115 receives the DNS query for the address record for the hostname example.com from the client device 110. The DNS resolver 115 may be a recursive resolver. Although not shown in FIG. 1, the DNS resolver 115 may also communicate with one or more other DNS servers such as root level servers, top-level DNS servers, etc. At some point, the DNS resolver 115 transmits the DNS query for the address record for the hostname example.com to a nameserver that is authoritative for the hostname, which in this example is the authoritative DNS server 120. Thus, at operation 152, the DNS resolver 115 transmits a DNS query for an address record (e.g., an A or AAAA record) to the authoritative DNS server 120. The DNS resolver 115 may be a public resolver, an ISP controlled resolver, a resolver on a home router, a resolver included on the client device 110, or an enterprise or access-controlled resolver.

The authoritative DNS server 120 receives the DNS query for an address record of the hostname from the DNS resolver 115. The authoritative DNS server 120 answers the DNS query for the address record for the hostname with one or more IP addresses that are selected using a selection algorithm that does not depend on the hostname being queried. Thus, the IP address(es) returned in the answer are selected without regard to the hostname being queried. Unlike conventional approaches, the authoritative DNS server 120 does not use a mapping of hostnames to IP addresses to make the IP address selection. Instead, the authoritative DNS server 120 performs an "on-query" binding in which the IP address is known for a particular hostname only in response to a DNS query for that particular hostname, and the binding is applicable only with respect to the resolver and/or client that made the query and for the duration of a time-to-live (TTL) value associated with the DNS record, which may be a value from 0 (which forces each query to get a new authoritative response) to seconds.

In some embodiments, prior to using the selection algorithm to select the IP address(es), the authoritative DNS server 120 determines to answer the DNS query with IP address(es) selected by the selection algorithm. If the authoritative DNS server 120 determines otherwise, the authoritative DNS server 120 may answer the request conventionally. The determination may be based on one or more criteria such as the queried hostname, the source IP address of the DNS query, and/or the location of the authoritative DNS server. For example, the authoritative DNS server 120 may determine that the queried hostname is configured for on-query binding. In such a case, the authoritative DNS server 120 may include, or have access to, a data structure that indicates the hostnames that are configured for on-query binding or a data structure that indicates the hostnames that are not configured for on-query binding. As another example, the authoritative DNS server 120 may determine to perform on-query binding based on the source IP address of the incoming request and/or the location of the authoritative DNS server. For instance, the authoritative DNS server 120 may be configured such that it performs on-query binding for certain source IP addresses (e.g., certain DNS resolvers) and/or location of that authoritative DNS server. In such a case, the authoritative DNS server 120 may include, or have access to, a data structure that indicates the source IP address(es) of DNS queries for which on-query binding will be performed and/or indicates the location(s) of the authoritative DNS server(s) that are configured for on-query binding, or include, or have access to a data structure that indicates the source IP address(es) of DNS queries for which on-query binding will not be performed and/or indicates the location(s) of the authoritative DNS server(s) that are not configured for on-query binding.

The authoritative DNS server 120 includes the selection module 125 and the pool of candidate IP addresses 130. The pool of candidate IP addresses 130 are IP addresses that may be selected by the selection module 125 when answering a query in an "on-query" binding fashion. Any IP address of the pool of candidate IP addresses 130 are capable of being selected to be included in the answer to the query regardless of the hostname being queried (at least with respect to the same protocol type) in some embodiments. For instance, if the query is for an A record, any IPv4 address of the pool of candidate IP addresses 130 can be selected. If the query is for an AAAA record, any IPv6 address of the pool of candidate IP addresses 130 can be selected. The pool of candidate IP addresses 130 may belong to the distributed cloud computing network. None of the IP addresses in the pool of candidate IP addresses 130 identify any particular device of the distributed cloud computing network in some embodiments. The pool of candidate IP addresses 130 may be IPv4 and/or IPv6 addresses. In an embodiment, one or more compute servers of the distributed cloud computing network listen for traffic at each of the pool of candidate IP addresses.

The selection module 125 executes a selection algorithm to select an IP address from the pool of candidate IP addresses 130 when answering the authoritative DNS query. Thus, at operation 154, the selection module 125 selects one or more of the IP addresses from the pool of candidate IP addresses 130 for answering the DNS query. The selection algorithm may be a random or pseudorandom selection from the pool of candidate IP addresses that makes no assumption about the query pattern or contents of the query. For instance, the selection algorithm does not base the selection on the hostname being queried. Thus, the particular IP address selected for the answer is selected without regard to the particular hostname being queried. The selected IP address is applicable only with respect to the resolver and/or client that made the query and for the duration of the TTL value associated with the DNS record, which may be a value from 0 (which forces each query to get a new authoritative response) to seconds. In some embodiments, the selected IP address does not identify a particular server of the distributed cloud computing network.

By way of example, given a prefix of length b, the selection algorithm may generate a random bitstring of 32-b (for IPv4) or 128-b (for IPv6). The selected IP address may be the concatenation of the prefix with the random bitstring. As an example, consider three different hostnames H1, H2, and H3. If using the random selection, the selected IP addresses returned for any of H1, H2, and H3, and H1, H1, H1, are equivalent. Thus, the IP addresses are identically and independently distributed (i.i.d.) irrespective of ordering or frequency.

The authoritative DNS server 120 includes the selected IP address in the answer to the DNS query at operation 156 that is transmitted to the DNS resolver 115. The record included in the answer may be associated with a time-to-live (TTL) value that in some embodiments is relatively short lived (e.g., less than a minute). The DNS resolver 115 may cache the record in accordance with the TTL. The DNS resolver 115 transmits the answer that includes the selected IP address for example.com to the client device 110 at operation 158. At this point, the client device 110 now has an IP address in which to reach the hostname example.com.

At operation 160, the client device 110 transmits a request (e.g., a HTTP or HTTPS request) that is addressed to the selected IP address for a resource of the hostname example.com. The compute server 140 is configured to receive traffic that is addressed to any of the pool of candidate IP addresses 130. Accordingly, the compute server 140 receives the request from the client device 110 that is addressed to the selected IP address. In some embodiments, the compute server 140 is one of multiple compute servers that are each configured to receive traffic that is addressed to any of the pool of candidate IP addresses 130. In such embodiments, the pool of candidate IP addresses 130 may be anycast IP addresses and which particular computer server that receives a particular request addressed to one of the pool of candidate IP addresses depends on which of the compute servers is closest to the requesting client device in terms of routing protocol configuration (e.g., Border Gateway Protocol (BGP) configuration according to an anycast implementation as determined by the network infrastructure (e.g., router(s), switch(es), and/or other network equipment between the requesting client and the compute servers.

The compute server 140 includes the request processing module 142 that is capable of processing network requests and responses such as HTTP/S requests and responses. Since the destination IP address of the incoming request at operation 160 does not consistently identify any particular hostname, the request processing module 142 cannot determine the hostname from the IP address itself (e.g., there is no mapping between hostnames and the pool of candidate IP addresses 130). To say it another way, the compute server 140 cannot determine the destination of the request based solely on the destination IP address. Instead, the request processing module 142 determines the particular hostname based on information other than the IP address itself that indicates the hostname. The information may be in a higher-level protocol field (higher than layer 3) that can be used to indicate a hostname. For instance, the SNI field or the HTTP host header included in the request at operation 162 (e.g., SNI if HTTPS is used, and the HTTP host header of HTTPS is not used) can be used to determine the hostname. If the request processing module 142 cannot determine the hostname, then in some embodiments the request is dropped.

After determining the hostname, the compute server 140 processes the traffic according to the request. In some cases, processing the traffic includes the request processing module 142 transmitting the request to the origin server 145 for the identified hostname. Thus, at operation 164, the requesting processing module 142 transmits the request to the origin server 145, which is the origin server for the identified hostname. In some embodiments, although the compute server 140 does not have a mapping between hostnames and the pool of candidate addresses 130, the compute server 140 may have a mapping between hostnames and corresponding origin IP addresses (IP addresses to reach the origin server for the hostnames). For instance, the IP address of the origin server 145 to reach the hostname example.com is 203.0.113.1 (not one of the addresses in the pool of candidate IP addresses 130). Accordingly, the request in operation 164 is addressed to the IP address 203.0.113.1 to reach the origin server 145. The origin server 145 processes the request which may include fetching and serving the requested resource. At operation 166, the compute server 140 receives a response from the origin server 145 (e.g., including the requested resource). The request processing module 142 processes the response, which may include caching the response, and transmits the response to the client device 110 at operation 168.

Figure 2:
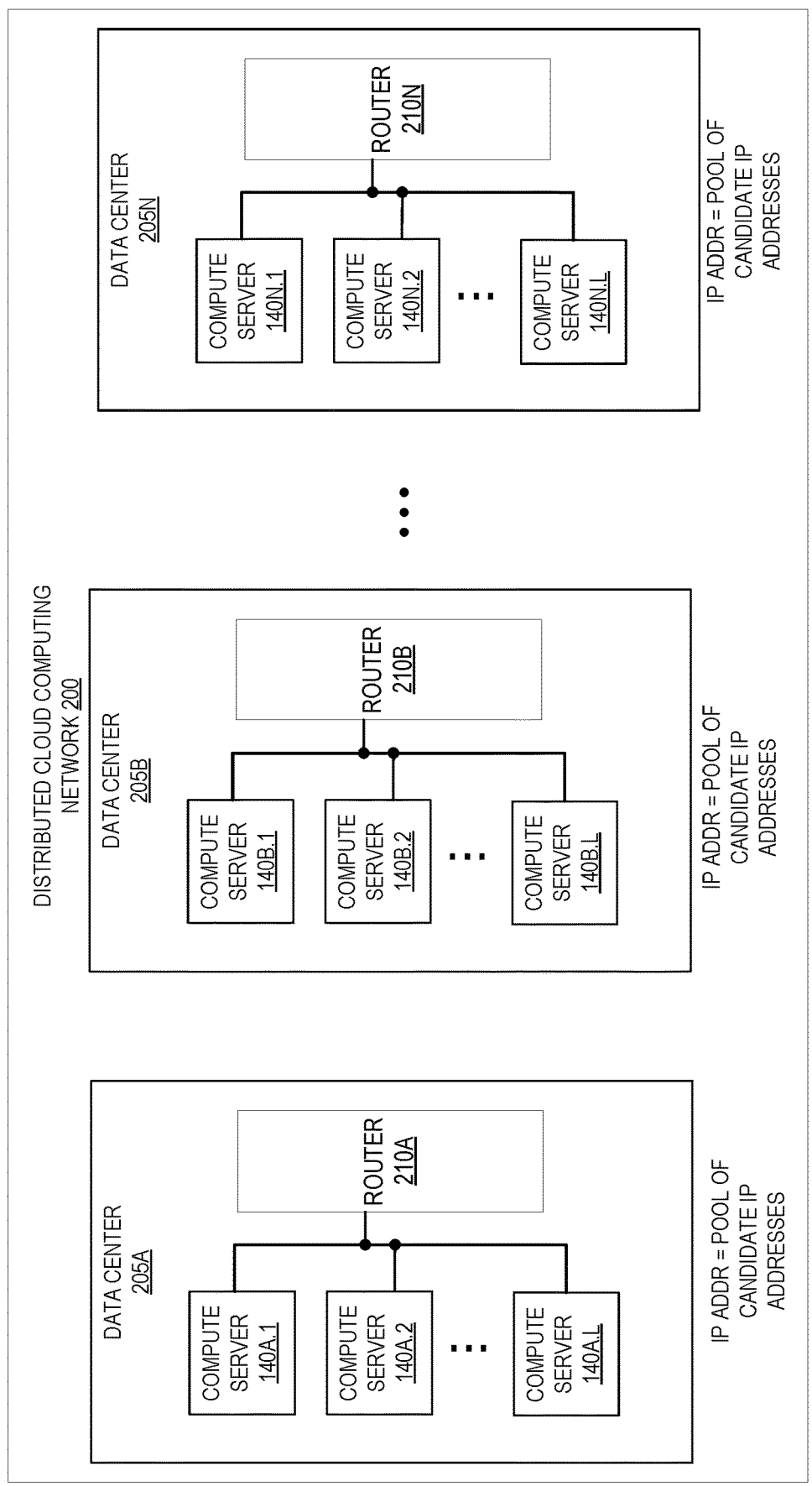
FIG. 2 shows an example of the distributed cloud computing network that includes multiple distributed cloud computing network nodes that each include multiple compute servers that can be used in some embodiments.

As previously described, in some embodiments the compute server 140 is one of multiple compute servers of a distributed cloud computing network. FIG. 2 shows an example of the distributed cloud computing network 200 that includes multiple distributed cloud computing network nodes 205A-205N that each include multiple compute servers that can be used in some embodiments. The distributed cloud computing network node 205A includes the compute servers 140A.1-140A.L that are connected to the router 210A, the distributed cloud computing network node 205B includes the compute servers 140B.1-140B.L that are connected to the router 210B, and the distributed cloud computing network node 205N includes the compute servers 140N.1-140N.L that are connected to the router 210N. Each of the compute servers in a particular distributed cloud computing network node may be separate physical devices or may be virtual instances running on one or more separate physical devices. In some embodiments, each compute server within the distributed cloud computing network node may process network layer traffic (e.g., HTTP/S, SPDY, FTP, TCP, UDP, IPSec, SIP, other IP protocol traffic, or other network layer traffic).

Although not illustrated in FIG. 2, one or more of the distributed cloud computing network nodes 205A-N may also include an authoritative DNS server like the authoritative DNS server 120. For instance, in an embodiment, each distributed cloud computing network node 205 includes an authoritative DNS server like the authoritative DNS server 120. In such an embodiment, the authoritative DNS servers may be anycasted to the same IP address such that a DNS query from a resolver will be received at the authoritative DNS server that is closest to the resolver in terms of routing protocol configuration (e.g., BGP configuration) according to an anycast implementation as determined by the network infrastructure (e.g., router(s), switch(es), and/or other network equipment) between the resolver and the authoritative DNS servers.

In some embodiments, each of the compute servers of the distributed cloud computing network 200 are configured to receive traffic at any of the pool of candidate IP addresses 130. For example, the routers 210A-N of the distributed cloud computing network nodes 205A-N may each advertise the IP prefix of the pool of candidate IP addresses 130 (e.g., as anycast IP addresses) and each of the compute servers of a particular distributed cloud computing network node advertise the IP prefix of the pool of candidate IP addresses 130 (e.g., as anycast IP addresses) to the corresponding router.

The compute servers of a particular distributed cloud computing network node may form an equal-cost multi-path (ECMP) group. For example, the compute servers 140A.1-

140A.L may form an ECMP group. Upon receiving traffic, the router 210A determines which of the compute servers 140A.1-140A-L to process the traffic based on ECMP selection or other selection mechanism (e.g., round robin, random, etc.). The decision may use a combination of multiple values: the source IP address, the source port, the destination IP address, the destination port, and optionally the protocol type (e.g., UDP, TCP) to ensure that the traffic with the same combination of those values will be routed to the same compute server.

Although consistent hashing ensures connections are not broken as servers are added and removed from the ECMP group, conventionally the groups themselves can grow to numbers that are difficult to manage and that reach the limits of router software. In contrast, the number of ECMP groups for the selected IP addresses may correspond to the number of prefixes being used for selecting. For example, if the pool of candidate IP addresses 130 have the same prefix, there may be a single ECMP group on each of the distributed cloud computing network nodes. Fewer ECMP groups reduce management complexity and may reduce the need for specialized hardware.

In embodiments where a random or pseudorandom selection is used as the selection algorithm, it is to be expected that at a particular snapshot of time (e.g., over a 24-hour period), each hostname has been allocated each IP address of the pool of candidate IP addresses. Thus, each hostname exists on all IP addresses rather than on any pre-assigned IP address. Measures of performance are also expected to be substantially uniformly distributed across the IP addresses (e.g., requests per IP, bytes per IP), irrespective of request patterns and demands. This expected uniform distribution can be used to detect IP-based reachability problems. For example, in some embodiments, the distributed cloud computing network determines whether there is a statistically meaningful difference between an IP address or prefix with the other IP addresses or prefixes (e.g., requests per IP, bytes per IP). If there is such a statistically meaningful difference, that IP address or prefix may be unavailable for certain clients. An IP address or prefix could be unavailable for certain clients due to some blacklist of IP addresses and/or routing errors. The distributed cloud computing network can use this information to improve network resilience and/or for debugging.

For instance, in some embodiments, the compute servers of the distributed cloud computing network log information related to the content request and/or response. This data can be used to determine one or more connection-oriented metrics including the number of requests per IP address, number of bytes transferred per IP address, etc. The data can also be used in lookups of various databases or data sources and/or comparisons with other snapshots to obtain information from outside of the distributed cloud computing network, such as network routes, routing prefixes, and autonomous systems. For example, values, changes, or other statistical information for network routes, routing prefixes, and/or autonomous systems outside of the distributed cloud computing network can be determined.

The statistical information may be transmitted to a centralized server for analysis and/or be analyzed at each distributed cloud computing network node. Further, an alert may set to trigger a notification if traffic (e.g., the number of requests per IP address, number of bytes transferred per IP address, etc.) has dropped below a threshold value and/or increased above a threshold value. The notification may be transmitted to an operator of the distributed cloud computing network.

Figure 3:
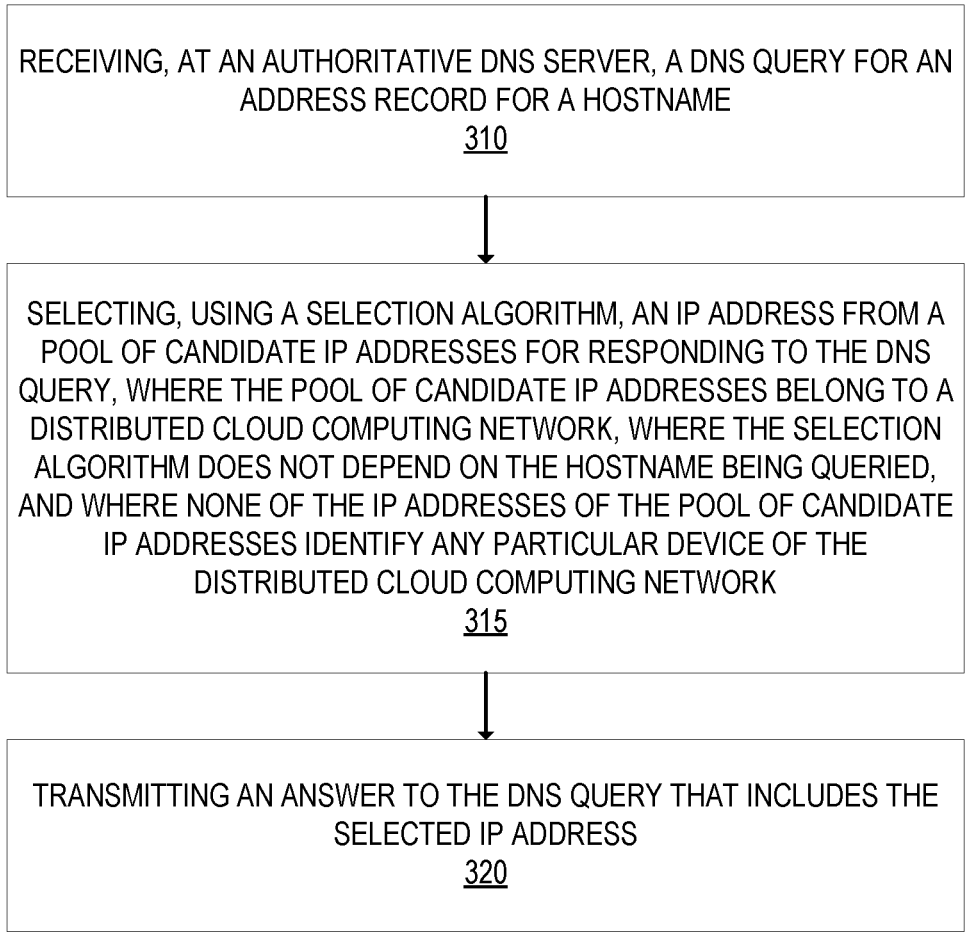
FIG. 3 is a flow diagram that illustrates exemplary operations for performing an on-query selection of an IP address according to an embodiment.

FIG. 3 is a flow diagram that illustrates exemplary operations for performing an on-query selection of an IP address according to an embodiment. The operations of FIG. 3 are described with reference to the exemplary embodiment of FIG. 1. However, the operations of FIG. 3 can be performed by embodiments other than those discussed with reference to FIG. 1, and the embodiments discussed with reference to FIG. 1 can perform operations different than those discussed with reference to FIG. 3.

At operation 310, the authoritative DNS server 120 receives a DNS query for an address record (e.g., A or AAAA record) for a hostname. The DNS query may be received from a DNS resolver such as the DNS resolver 115. In this example, the authoritative DNS server 120 is authoritative for the requested record. Next, at operation 315, the authoritative DNS server 120 selects, using a selection algorithm, an IP address from the pool of candidate IP addresses 130 for responding to the DNS query. The pool of candidate IP addresses 130 belong to a distributed cloud computing network. The selection algorithm does not depend on the hostname being queried in some embodiments. Thus, the selection algorithm will select an IP address to answer the query without regard to the particular hostname being queried. None of the IP addresses of the pool of candidate IP addresses 130 identify any particular device of the distributed cloud computing network (e.g., any compute server of the distributed cloud computing network).

In some embodiments, the selection algorithm uses a random or pseudorandom function, and no assumption is made about the query pattern or contents of the query. For instance, given a prefix of length b, the selection algorithm may generate a random bitstring of 32-b (for IPv4) or 128-b (for IPv6). The selected IP address may be the concatenation of the prefix with the random bitstring. In some embodiments, the selection algorithm uses the same prefix for each of the pool of candidate IP addresses. For any sufficient snapshot of time, each hostname exists on all IP addresses rather than any pre-assigned IP address.

In some embodiments, the selection algorithm uses multiple prefixes for the pool of candidate IP addresses where the prefix portion is selected and the host portion is independently selected (which may be a random selection such as a random bitstring). In such embodiments, the selection algorithm may apply different weights to different prefixes that determines the portion of the traffic. For example, the weights may be configured so 10 prefixes could share 10% of the total traffic. As another example, if one wanted to shift traffic from one prefix to another prefix, a percentage of a prefix could be redirected to other prefixes (e.g., 5% of a single prefix could be redirected to another prefix).

In some embodiments there is an authoritative DNS server at each distributed cloud computing network node of the distributed cloud computing network and the pool of candidate IP addresses may be different for each distributed cloud computing network node with non-overlapping addresses. That is, the pool of candidate IP addresses available to be selected by an authoritative DNS server at a first distributed cloud computing network node is different from the pool of candidate IP addresses available to be selected by an authoritative DNS server at a second distributed cloud computing network node. For instance, a different prefix may be used for each different distributed cloud computing network node. In such embodiments, the distributed cloud computing network node in which the selected IP address is selected can be determined based on the value of the selected IP address.

In some embodiments there is an authoritative DNS server at each distributed cloud computing network node of the distributed cloud computing network and the selection algorithm selects a unique prefix for each unique distributed cloud computing network node. For instance, an authoritative DNS server of a first distributed cloud computing network node selects an IP address with a first prefix, an authoritative DNS server of a second distributed cloud computing network node selects an IP address with a second prefix, and so on. Thus, the particular distributed cloud computing network node that included the authoritative DNS server that answered the DNS query can be determined through the prefix of the selected IP address. In some of these embodiments, although an authoritative DNS server selects an IP address with a particular prefix, each of the compute servers of the distributed cloud computing network node are configured to receive and process traffic addressed to the selected IP address. For instance, the router and/or compute servers of the distributed cloud computing network node may advertise each of the prefixes for each distributed cloud computing network node. This allows connecting DNS queries with ensuing requests. This also allows identifying and/or characterizing DNS resolvers contributions to traffic and load, and/or may allow the inference of routing decisions of downstream Internet Service Provider(s).

For instance, since the authoritative DNS servers are anycasted, the requesting DNS resolver will contact the closest authoritative DNS server as determined by an anycast implementation. Since that authoritative DNS server selects an IP address that has a prefix unique to that distributed cloud computing network node, a subsequent request for content may likely be received at that same distributed cloud computing network node. However, this is not always the case. For instance, a content request that is addressed to an IP address with a first prefix identifies the first distributed cloud computing network node. If such a content request is received at a router and/or compute server at a different distributed cloud computing network node, then the DNS query was answered at a different distributed cloud computing network node from the distributed cloud computing network node that received the ensuing request for content. This may happen because the DNS resolver that makes the DNS query is at a different geographic or logical location than the client device that makes the ensuing request, or could happen due to a route leak and/or a routing configuration error. For instance, if the DNS traffic (e.g., queries/answers) is isolated to a prefix that is different than the prefix(es) selected by the selection algorithm for other traffic (e.g., HTTP traffic), router leaks and/or routing configuration errors may be detected. As an example, if a content request is addressed to an IP address with a first prefix that identifies a first distributed cloud computing node but is received at a router and/or compute server of a different distributed cloud computing node, this may be a signal that either the DNS prefix has leaked or been misconfigured causing the DNS query to be answered by an authoritative DNS server at the first distributed cloud computing node, or that the non-DNS prefix has leaked or been misconfigured causing the content traffic to be received at the different distributed cloud computing node. As an example, if a distributed cloud computing node in New York starts seeing an uptick in traffic on IP addresses that are only returned by a distributed cloud computing node in Brazil, there may be a routing leak or routing misconfiguration.

In some embodiments, the selection algorithm selects a unique IP address for each unique DNS resolver. For instance, for a first DNS resolver, the selection algorithm selects a first IP address or prefix regardless of the requested hostname, and for a second DNS resolver, the selection algorithm selects a second IP address or prefix regardless of the requested hostname. In such embodiments, the address of the ensuing content request identifies the particular resolver that made the DNS query. This allows identifying and/or characterizing DNS resolvers contributions to traffic and load.

In some embodiments, the data used for identifying and/or characterizing DNS resolvers contributions to traffic and load, subsequent IP address selection can be used for resolver-specific IP addresses to influence load and routing and/or to generate region specific routes.

In some embodiments, prior to using the selection algorithm to select the IP address(es) in operation 315, the authoritative DNS server 120 determines to answer the DNS query with IP address(es) selected by the selection algorithm. If the authoritative DNS server 120 determines otherwise, the authoritative DNS server 120 may answer the request conventionally. The determination may be based on one or more criteria such as the queried hostname, the source IP address of the DNS query, and/or the location of the authoritative DNS server. For example, the authoritative DNS server 120 may determine that the queried hostname is configured for on-query binding. In such a case, the authoritative DNS server 120 may include, or have access to, a data structure that indicates the hostnames that are configured for on-query binding or a data structure that indicates the hostnames that are not configured for on-query binding. As another example, the authoritative DNS server 120 may determine to perform on-query binding based on the source IP address of the incoming request and/or the location of the authoritative DNS server. For instance, the authoritative DNS server 120 may be configured such that it performs on-query binding for certain source IP addresses (e.g., certain DNS resolvers) and/or location of that authoritative DNS server. In such a case, the authoritative DNS server 120 may include, or have access to, a data structure that indicates the source IP address(es) of DNS queries for which on-query binding will be performed and/or indicates the location(s) of the authoritative DNS server(s) that are configured for on-query binding, or include, or have access to a data structure that indicates the source IP address(es) of DNS queries for which on-query binding will not be performed and/or indicates the location(s) of the authoritative DNS server(s) that are not configured for on-query binding.

After selecting the IP address, the authoritative DNS server 120 generates an answer to the DNS query that includes the selected IP address and transmits the answer to the requesting resolver 115 at operation 320. The resolver 115 may then forward the answer to the requesting client device 110.

Figure 4:
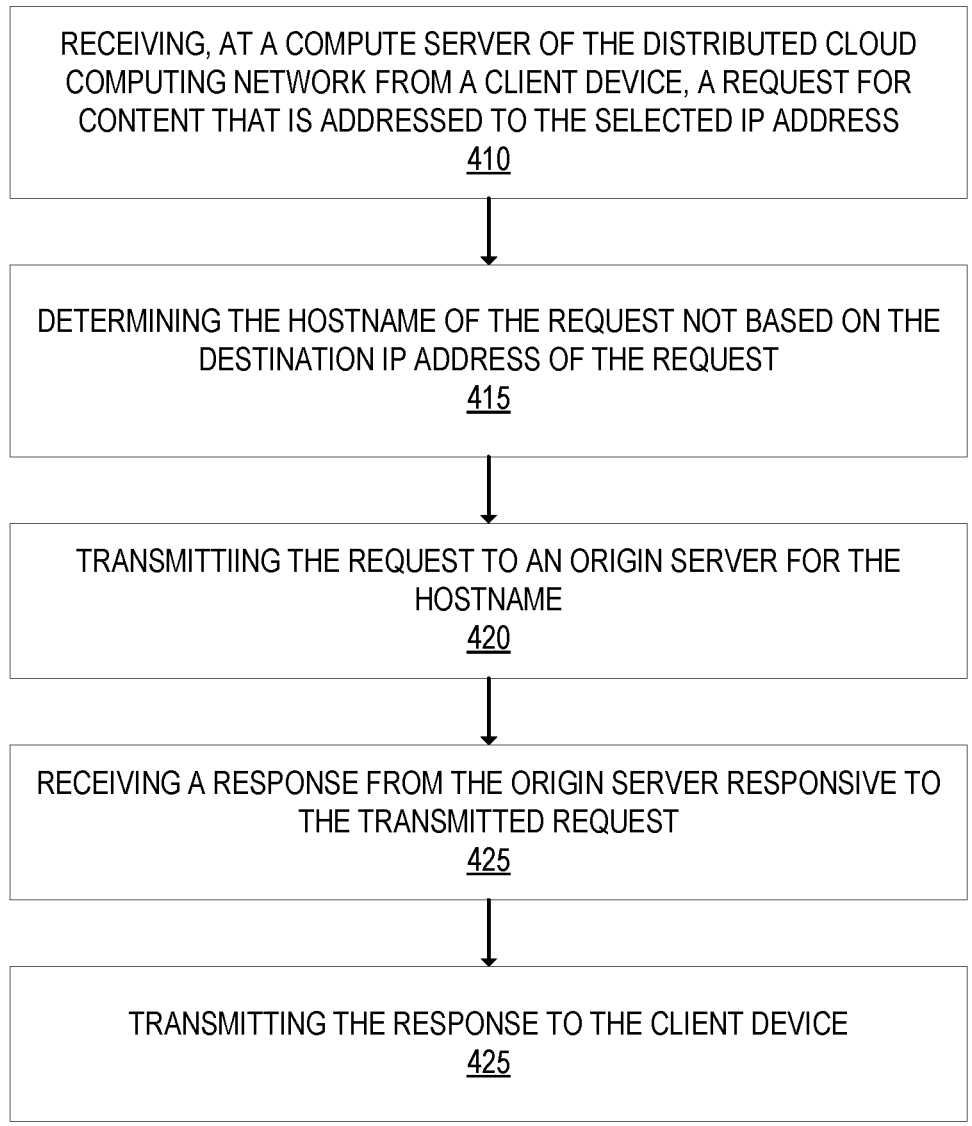
FIG. 4 is a flow diagram that illustrates exemplary operations performed at a compute server of a distributed cloud computing network for processing IP traffic that was addressed to an IP address that was selected using an on-query selection according to an embodiment.

Now that the client device 110 has an IP address in which to reach its intended hostname, the client device 110 may make a request (e.g., an HTTP or HTTPS request) that is addressed to that selected IP address. FIG. 4 is a flow diagram that illustrates exemplary operations performed at a compute server of a distributed cloud computing network for processing IP traffic that was addressed to an IP address that was selected using an on-query selection according to an embodiment. The operations of FIG. 4 are described with reference to the exemplary embodiment of FIG. 1. However, the operations of FIG. 4 can be performed by embodiments other than those discussed with reference to FIG. 1, and the embodiments discussed with reference to FIG. 1 can perform operations different than those discussed with reference to FIG. 4.

At operation 410, the compute server 140 receives from the client device 110 a request for content that is addressed to an IP address that was selected by DNS using an on-query selection as previously described herein. The request for content may be an HTTP or HTTPS request, for example.

Since the destination IP address of the incoming IP traffic does not consistently identify any particular hostname, the compute server that receives the incoming IP traffic cannot determine the hostname from the IP address itself. To say it another way, the compute server does not know the intended destination of the incoming IP traffic based solely on the IP address. Instead, at operation 415, the compute server 140 determines the hostname based on information other than the destination IP address. For instance, the compute server 140 may determine the hostname based on the SNI field or the HTTP host header. For instance, if the request is an HTTPS request, the compute server 140 uses the SNI field to determine the hostname. If the request is an HTTP request, the compute server 140 may use the HTTP host header to determine the hostname.

After determining the hostname, the compute server 140 processes the request. Processing the request may include transmitting the request to the origin server of the hostname. Although there is not a mapping between the selected IP address and the hostname, there is a mapping between the hostname and the origin IP address (the origin IP address is not exposed during the DNS resolution). The compute server can access this mapping to determine the origin IP address for the hostname. In the example of FIG. 4, the processing includes transmitting the request to an origin server for further processing. Thus, at operation 420, the compute server 140 transmits the request to an origin server for the hostname. The origin server in turn processes the request which may include retrieving and/or generating the requested resource. Next, at operation 425, the compute server 140 receives a response from the origin server responsive to the transmitted request. The response may be an HTTP or HTTPS response. The response may include the requested content. Next, at operation 430, the compute server 140 transmits the response to the requesting client device 110.

A distributed cloud computing network node, including any of the router(s), switch(es), proxy server(s), and DNS server(s) of the node, may receive legitimate traffic and illegitimate traffic. As used herein, illegitimate traffic is traffic that is not meant for a legitimate purpose, even though it may include legitimate content. The illegitimate traffic may be part of a DoS attack. A DoS attack typically involves transmitting a large amount of traffic at an identified target to delay or interrupt the service provided by that target such that the target cannot respond, or responds slowly, to legitimate traffic. The DoS attack may be a distributed DoS (DDoS) attack where multiple clients transmit a large amount of traffic directed at a target. In a DDoS attack, usually the clients are devices that are infected with a virus, Trojan, or other malware that allows an attacker to carry out the attack. Illegitimate traffic may include traffic that is not malformed and is otherwise legitimate but for its intent, which is typically to overload a system to prevent it from servicing other legitimate traffic. For example, the traffic may be many legitimate HTTP requests (much larger than would otherwise be expected) transmitted from a single client or a group of clients that are participating in a DoS attack. As another example, a DDoS attack may be in the form of excessive cookies, headers, HTML content, etc., that is designed to overload system resources.

At any given time, the target for a DoS attack may be any IP address selected during the on-query selection. For instance, the attack may be a layer 3 and/or layer 4 attack (e.g., a SYN flood attack). At any given time, the target for a DoS attack may be a layer 7 attack directed at any of the hostnames (e.g., a large number of HTTP requests sent to a hostname).

In some embodiments, upon detecting an attack directed at an IP address selected during the on-query selection, that IP address will be ineligible to be selected by the selection algorithm for future on-query selection (at least until a time the attack has ended). For instance, that IP address can be removed from the pool of candidate IP addresses. In some embodiments, upon detecting an attack directed at one of the IP addresses in the pool of candidate IP addresses, a message is sent to the authoritative DNS server 120 to remove that IP address from the pool of candidate IP addresses 130. The message may be sent from a centralized server of the distributed cloud computing network and/or any of the compute servers of the distributed cloud computing network. The distributed cloud computing nodes may also stop announcing that IP address.

In some embodiments, upon detecting an attack directed at a hostname, that hostname is removed from the on-query selection and instead one or more IP addresses are bound to that hostname (at least until a time the attack has ended). For instance, if the hostname example.com was determined to be subject to a layer 7 attack, the hostname example.com is removed from the on-query selection and instead assigned one or more IP addresses to be used in answers to DNS queries. In some embodiments, upon detecting an attack directed at a hostname, a message is sent to the authoritative DNS server 120 to remove that hostname from the on-query selection and instead assign one or more IP addresses to be used in future answers to DNS queries (the one or more IP addresses not part of the pool of candidate IP addresses). The message may specify the IP address(es) to assign to the hostname. The message may be sent from a centralized server of the distributed cloud computing network and/or any of the compute servers of the distributed cloud computing network.

DoS attacks may be identified in several different ways, which may be different based on the type of attack. Many DoS attacks involve sending a large amount of traffic of a certain type to an intended target. In some embodiments, the distributed cloud computing network (e.g., one or more compute servers and/or control servers) determines when there is an abnormal amount of traffic that is destined to a particular destination (e.g., the traffic spikes from what is normally encountered). By way of example, a node may establish a threshold amount of what the normal traffic rate is for a hostname and/or IP address and determine when traffic exceeds that threshold. In one embodiment, the normal traffic rates may be individual and separate for a particular node and the DoS attack is identified for each individual node, while in some embodiments a DoS attack is identified through an aggregation of traffic across all nodes. As another example, a DoS attack may be detected upon receiving an indication from an owner or operator of a hostname that indicates that the hostname is under attack.

By way of a specific example, a DoS attack may be detected by using one or more parameters that exceed a threshold, including one or more of the following to a particular hostname: the number of packets, the amount of bandwidth, the number of User Datagram Protocol (UDP) packets/second, the number of Transmission Control Protocol (TCP) packets/second, the number of connections opened, the number of failed connections, and the ratio of successfully opened connections versus failed connections. These are just examples as there may be other parameters used in combination with, or in lieu of, the above to detect a DoS attack. For example, the distributed cloud computing network may detect if a hostname has gone offline due to a heavy load, which may be an indication of a DoS attack. As another example, the detection of a spike in metrics pertaining to a page or a resource request may be an indication of a DoS attack (e.g., a particular request header, cookie, size of the request, non-standard control characters, a large number of GET parameters, a large number of POST parameters, etc.).

Embodiments have been described where the on-query selection selects an IP address from a pool of candidate IP addresses for responding to a DNS query for a hostname. In other embodiments, the on-query selection selects the same IP address per protocol type for a certain period of time for all eligible hostnames for responding to a DNS query for the hostname. For instance, in an embodiment, the authoritative DNS server answers each DNS query for an address record of the same protocol type with the same IP address for each hostname for which that DNS server is authoritative, at least for a time period (e.g., the same IPv4 address for an A record query; and the same IPv6 address for an AAAA record query), optionally after determining that the query is to be answered using on-query selection. Depending on the size of the distributed cloud computing network, there may be thousands or millions of hostnames that resolve to the same IP address.

The same IP address may be included in DNS answers for a period of time (e.g., one hour, one day, one week, etc.). After the period is complete, a different IP address may be included in DNS answers for a period of time.

In some embodiments, one or more hostnames for which the DNS server is authoritative may not be included for single IP selection. For instance, certain hostnames may be opted out of the single IP selection. As another example, if there is an attack directed at a particular hostname (e.g., a layer 7 attack), that hostname may be removed from the single IP selection and instead assigned one or more IP addresses to be used in answers to DNS queries.

In some embodiments, upon detecting an attack directed at the single IP address, the authoritative DNS server selects a different single IP address for subsequent answers at least for a predetermined period of time. An attack directed at the single IP address may be performed as previously described.

In some embodiments, the single IP address may be different for different distributed cloud computing nodes. For instance, a first authoritative DNS server of a first node may authoritatively answer DNS queries with a first single IP address for eligible hostnames (at least for a predetermined period of time) and a second authoritative DNS sever of a second node may authoritatively answer DNS queries with a different second single IP address for eligible hostnames (at least for a predetermined period of time).

In some embodiments, since a single IP address is returned for eligible hostnames, DNS resolvers may not be required to query the authoritative DNS server for those hostnames. Instead, they may simply return the single IP address to the requesting client device. For instance, the authoritative DNS server may provide a signed zone file such that the DNS resolvers and/or clients may periodically download and use to return the single IP address for queries.

Figure 5:
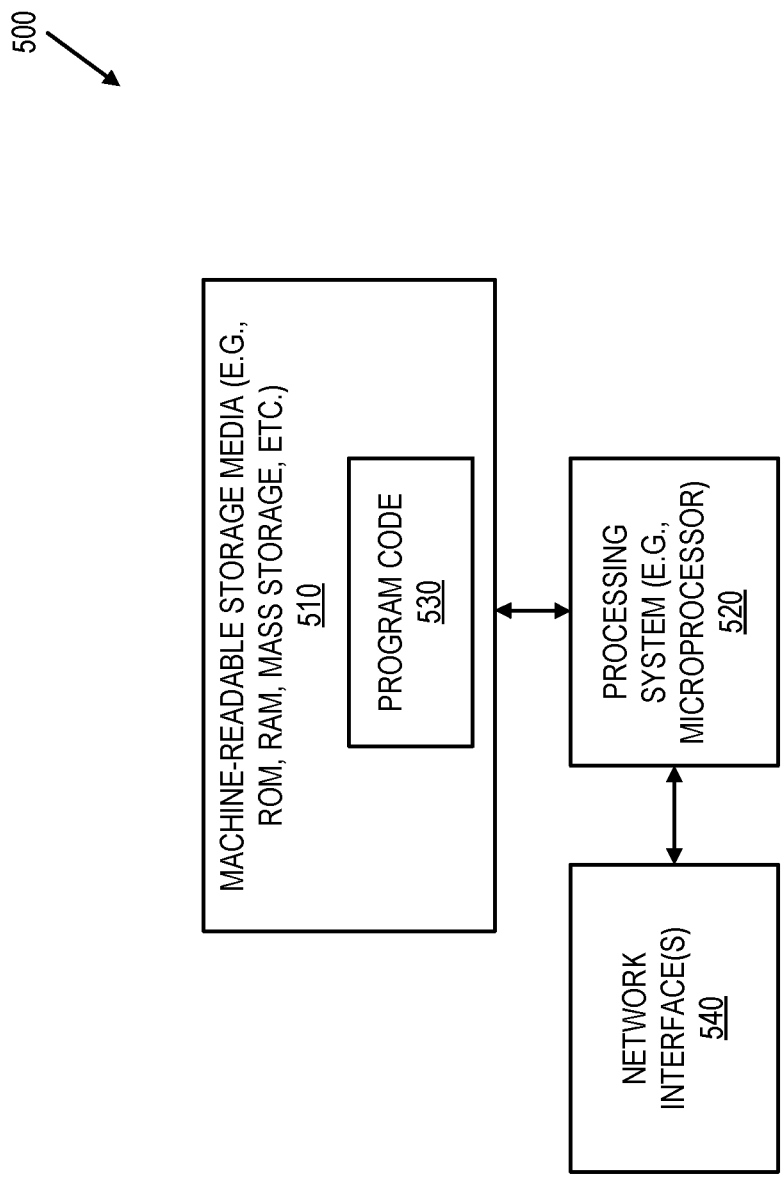
FIG. 5 illustrates a block diagram for an exemplary data processing system 500 that may be used in some embodiments.

FIG. 5 illustrates a block diagram for an exemplary data processing system 500 that may be used in some embodiments. One or more such data processing systems 500 may be used to implement the embodiments and operations described with respect to the compute servers, DNS servers, or other computing devices. The data processing system 500 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 520 (e.g., one or more processors and connected system components such as multiple connected chips). For example, the depicted machine-readable storage media 510 may store program code 530 that, when executed by the processor(s) 520, causes the data processing system 500 to perform any of the operations described herein.

The data processing system 500 also includes one or more network interfaces 540 (e.g., a wired and/or wireless interfaces) that allows the data processing system 500 to transmit data and receive data from other computing devices, typically across one or more networks (e.g., Local Area Networks (LANs), the Internet, etc.). Additional components, not shown, may also be part of the system 500, and, in certain embodiments, fewer components than that shown in One or more buses may be used to interconnect the various components shown in FIG. 5.

The techniques shown in the figures can be implemented using code and data stored and executed on one or more computing devices (e.g., a compute server, a client device, a router, an origin server). Such computing devices store and communicate (internally and/or with other computing devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such computing devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth to provide a more thorough understanding of the present embodiments. It will be appreciated, however, by one skilled in the art that the invention may be practiced without such specific details. In other instances, full software instruction sequences have not been shown in detail in order not to obscure understanding of the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
    receiving, at a first authoritative domain name system (DNS) server, a first plurality of DNS queries for a first plurality of hostnames, wherein the first plurality of hostnames is at least one thousand;
    answering each of the first plurality of DNS queries with a same first single IP address, wherein each of a plurality of servers of a distributed cloud computing network is capable of receiving traffic addressed to the same first single IP address;
    receiving, by at least some of the plurality of servers of the distributed cloud computing network from a first plurality of client devices, requests for content that are addressed to the same first single IP address;
    for each received request from one of the first plurality of client devices, performing:
        determining a hostname to which the request is directed based on a Server Name Indication (SNI) field or an HTTP host header field associated with that request,
        transmitting the request to an origin server for the determined hostname,
        receiving a response from the origin server responsive to the transmitted request, and
        transmitting the response to the requesting client device;
    receiving, at a second authoritative DNS server, a second plurality of DNS queries for the first plurality of hostnames;
    answering each of the second plurality of DNS queries with a same second single IP address, wherein each of the plurality of servers is capable of receiving traffic addressed to the same second single IP address, and wherein the same first single IP address is different from the same second single IP address;
    receiving, by at least some of the plurality of servers of the distributed cloud computing network from a second plurality of client devices, requests for content that are addressed to the same second single IP address; and
    for each received request from one of the second plurality of client devices, performing:
        determining a hostname to which the request is directed based on a Server Name Indication (SNI) field or an HTTP host header field associated with that request,
        transmitting the request to an origin server for the determined hostname,
        receiving a response from the origin server responsive to the transmitted request, and
        transmitting the response to the requesting client device.

2. The method of claim 1, further comprising:
    detecting a layer 7 attack directed to a first hostname of the first plurality of hostnames; and
    responsive to the detected layer 7 attack, binding an IP address that is not the same first single IP address to an address record for the first hostname such that subsequent DNS queries for that address record return the bound IP address instead of the same first single IP address.

3. A system, comprising:
    a first authoritative domain name system (DNS) server adapted to:
        receive a first plurality of DNS queries for address records for a first plurality of hostnames, wherein the first plurality of hostnames is at least one thousand, and
        answer each of the first plurality of DNS queries with a same first single IP address, wherein each of a plurality of servers of a distributed cloud computing network is capable of receiving traffic addressed to the same first single IP address;
    a second authoritative DNS server adapted to:
        receive a second plurality of DNS queries for address records for the first plurality hostnames, and
        answer each of the second plurality of DNS queries with a same second single IP address, wherein each of the plurality of servers are capable of receiving traffic addressed to the same second single IP address, wherein the same first single IP address is different from the same second single IP address, and wherein each of the plurality of servers is capable of receiving traffic addressed to the same second single IP address;
    a first portion of the plurality of servers, wherein each of the first portion of the plurality of servers is adapted to:
        receive requests from a first plurality of client devices for content addressed to the same first single IP address, and
        for each received request from one of the first plurality of client devices,
            determine a hostname to which the request is directed based on a Server Name Indication (SNI) field or an HTTP host header field associated with that request,
            transmit that request to an origin server for the determined hostname,
            receive a response from the origin server responsive to the transmitted request, and
            transmit the response to the requesting client device; and a second portion of the plurality of servers, wherein each of the second portion of the plurality of servers is adapted to:
receive requests from a second plurality of client devices for content addressed to the same second single IP address, and
for each received request from one of the second plurality of client devices,
determine a hostname to which the request is directed based on a Server Name Indication (SNI) field or an HTTP host header field associated with that request,
transmit that request to an origin server for the determined hostname,
receive a response from the origin server responsive to the transmitted request, and
transmit the response to the requesting client device.

4. The system of claim 3, wherein the first authoritative DNS server is further adapted to:
responsive to a detected layer 7 attack directed to a particular hostname of the plurality of hostnames, bind one or more IP addresses that are not the same first single IP address to an address record for that particular hostname such that subsequent DNS queries for that address record return the bound one or more IP addresses instead of the same first single IP address.

5. A system, comprising:
a first non-transitory machine-readable storage medium that provides instructions that, when executed by a processing system of a first authoritative domain name system (DNS) server cause first operations to be performed including:
receiving a first plurality of DNS queries for a first plurality of hostnames, wherein the first plurality of hostnames is at least one thousand, and
answering each of the first plurality of DNS queries with a same first single IP address, wherein each of a plurality of servers of a distributed cloud computing network is capable of receiving traffic addressed to the same first single IP address;
a second non-transitory machine-readable storage medium that provides instructions that, when executed by a processing system of a second authoritative DNS server cause second operations to be performed including:
receiving a second plurality of DNS queries for the first plurality of hostnames, and
answering each of the second plurality of DNS queries with a same second single IP address, wherein each of the plurality of servers is capable of receiving traffic addressed to the same second single IP address, and wherein the same first single IP address is different from the same second single IP address; and
a third non-transitory machine-readable storage medium that provides instructions that, when executed by a processing system of one of the plurality of servers of the distributed cloud computing network cause third operations to be performed including:
receiving, at the one of the plurality of servers of the distributed cloud computing network from a first client device, a first request for content that is addressed to the same first single IP address,
determining the hostname to which the first request is directed based on a Server Name Indication (SNI) field or an HTTP host header field associated with the first request for content,
transmitting the first request to a first origin server for the determined hostname,
receiving a first response from the first origin server responsive to the transmitted first request, and
transmitting the first response to the first client device; and
a fourth non-transitory machine-readable storage medium that provides instructions that, when executed by a processing system of a second one of the plurality of servers of the distributed cloud computing network cause fourth operations to be performed including:
receiving, at the second one of the plurality of servers of the distributed cloud computing network from a second client device, a second request for content that is addressed to the same second single IP address,
determining the hostname to which the second request is directed based on a Server Name Indication (SNI) field or an HTTP host header field associated with the second request for content,
transmitting the second request to a second origin server for the determined hostname,
receiving a second response from the second origin server responsive to the transmitted second request, and
transmitting the second response to the second client device.

6. The system of claim 5, wherein the third operations further comprise:
responsive to a detected layer 7 attack directed to a particular hostname of the first plurality of hostnames, binding an IP address that is not the same first single IP address to an address record for that particular hostname such that subsequent DNS queries for that address record return the bound IP address instead of the same first single IP address.

7. The method of claim 1, further comprising:
wherein the answering each of the first plurality of DNS queries with the same first single IP address is done in a first period;
receiving, at the first authoritative DNS server during a second period, a third plurality of DNS queries for a second plurality of hostnames, wherein the first period is different from the second period;
answering each of the third plurality of DNS queries with a same third single IP address, wherein the same first single IP address is different from the same third single IP address; and
receiving, at the plurality of servers of the distributed cloud computing network from the third plurality of client devices, requests for content that are addressed to the same third single IP address.

8. The method of claim 1, further comprising:
receiving, at the first authoritative DNS server, a third DNS query for a second hostname that is not one of the first plurality of hostnames; and
answering the third DNS query with a third IP address that is different from the same first single IP address.

9. The method of claim 1, further comprising:
providing a signed zone file to one or more DNS resolvers that maps the first plurality of hostnames with the same first single IP address.

10. The system of claim 3, wherein the first authoritative DNS server is further adapted to:
receive a third DNS query for a second hostname that is not one of the first plurality of hostnames; and answer the third DNS query with a third IP address that is different from the same first single IP address.

11. The system of claim 3, wherein the first authoritative DNS server is further adapted to:
provide a signed zone file to one or more DNS resolvers that maps the first plurality of hostnames with the same first single IP address.

12. The system of claim 5, further comprising:
wherein the answering each of the first plurality of DNS queries with the same first single IP address is done in a first period, and wherein the first operations further include:
receiving, at the first authoritative DNS server during a second period, a third plurality of DNS queries for a second plurality of hostnames, wherein the first period is different from the second period, and
answering each of the third plurality of DNS queries with a same third single IP address, wherein the same first single IP address is different from the same third single IP address; and
wherein the third operations further include:
receiving, at the one of the plurality of servers of the distributed cloud computing network from at least some of the plurality of client devices, requests for content that are addressed to the same second single IP address.

13. The system of claim 5, wherein the first operations further include:
receiving a third DNS query for a second hostname that is not one of the first plurality of hostnames; and
answering the third DNS query with a third IP address that is different from the same first single IP address.

14. The system of claim 5, wherein the first operations further include:
providing a signed zone file to one or more DNS resolvers that maps the first plurality of hostnames with the same first single IP address.

* * * * *